(12) United States Patent
Keen

(10) Patent No.: US 11,586,297 B2
(45) Date of Patent: Feb. 21, 2023

(54) FLUID CHORD/CHARACTER ENTRY

(71) Applicant: Riley Ford Keen, The Colony, TX (US)

(72) Inventor: Riley Ford Keen, The Colony, TX (US)

(*) Notice: Subject to any disclaimer, the term of this patent is extended or adjusted under 35 U.S.C. 154(b) by 0 days.

(21) Appl. No.: 17/834,581

(22) Filed: Jun. 7, 2022

(65) Prior Publication Data

US 2022/0300091 A1 Sep. 22, 2022

Related U.S. Application Data

(63) Continuation of application No. 16/901,836, filed on Jun. 15, 2020, now abandoned.

(60) Provisional application No. 62/921,351, filed on Jun. 14, 2019.

(51) Int. Cl.
*G06F 3/023* (2006.01)
*G06F 3/02* (2006.01)

(52) U.S. Cl.
CPC .......... *G06F 3/0235* (2013.01); *G06F 3/0219* (2013.01)

(58) Field of Classification Search
CPC ............ H01H 2217/012; H03M 11/04; H03M 11/06; H03M 11/08; H03M 11/10; H03M 11/14; G06F 3/02; G06F 3/023; G06F 3/0231; G06F 3/0233; G06F 3/0234; G06F 3/0235; G06F 3/0237; G06F 3/0219
See application file for complete search history.

(56) References Cited

U.S. PATENT DOCUMENTS

| 3,022,878 | A | | 2/1962 | Seibel et al. | |
|---|---|---|---|---|---|
| 3,428,747 | A | | 2/1969 | Alferieff | |
| 3,945,482 | A | | 3/1976 | Einbinder | |
| 4,005,388 | A | | 1/1977 | Morley et al. | |
| 4,042,777 | A | * | 8/1977 | Bequaert | B41J 5/10 708/145 |
| 4,067,431 | A | | 1/1978 | Whitaker | |
| 4,360,892 | A | | 11/1982 | Endfield | |
| 4,467,321 | A | | 8/1984 | Volnak | |
| 4,490,056 | A | | 12/1984 | Whitaker | |
| 4,638,306 | A | * | 1/1987 | Rollhaus | B41J 5/10 400/100 |
| 4,655,621 | A | | 4/1987 | Holden | |

(Continued)

FOREIGN PATENT DOCUMENTS

| CN | 107008005 A | 8/2017 |
|---|---|---|
| DE | 202008000632 U1 | 7/2008 |
| JP | 2004038829 A | 2/2004 |

*Primary Examiner* — Franklin D Balseca
(74) *Attorney, Agent, or Firm* — Conley Rose, P.C.; Jonathan K. Polk

(57) ABSTRACT

A data entry system comprises a processor configured to receive a first data entry, make a first determination whether the first data entry is a first character entry or a first chorded entry, select a first output based on the first determination, and transmit the first output. The processor is further configured to receive, after transmitting the first output, a second data entry; make a second determination whether the second data entry is a second character entry or a second chorded entry; select a second output based on the second determination; and transmit the second output. The first data entry is the first character entry and the second data entry is the second chorded entry, or the first data entry is the first chorded entry and the second data entry is the second character entry.

20 Claims, 10 Drawing Sheets

(56) References Cited

U.S. PATENT DOCUMENTS

| | | |
|---|---|---|
| 4,680,572 A | 7/1987 | Meguire et al. |
| 4,727,478 A | 2/1988 | Endfield et al. |
| 4,791,408 A | 12/1988 | Heusinkveld |
| 4,833,446 A | 5/1989 | Eilam et al. |
| 4,836,700 A | 6/1989 | Jensen |
| 4,891,777 A | 1/1990 | Lapeyre |
| 4,897,649 A | 1/1990 | Stucki |
| 5,087,910 A | 2/1992 | Guyot-Sionnest |
| 5,197,811 A | 3/1993 | Levinrad |
| 5,270,709 A | 12/1993 | Niklsbacher |
| 5,281,966 A | 1/1994 | Walsh |
| 5,432,510 A | 7/1995 | Matthews |
| 5,473,325 A | 12/1995 | McAlindon |
| 5,493,654 A | 2/1996 | Gopher et al. |
| 5,535,421 A * | 7/1996 | Weinreich ............ G06F 3/0235 708/146 |
| 5,793,312 A | 8/1998 | Tsubai |
| 5,828,323 A | 10/1998 | Bartet |
| 5,900,864 A | 5/1999 | Macdonald |
| 6,429,854 B1 | 8/2002 | McKown |
| 6,625,283 B1 | 9/2003 | Sato |
| 7,196,691 B1 | 3/2007 | Zweig |
| 7,973,762 B2 | 7/2011 | Naimo |
| 8,487,872 B2 | 7/2013 | McAlindon |
| 10,121,388 B2 | 11/2018 | Seim et al. |
| 2001/0028340 A1 | 10/2001 | Mailman |
| 2002/0025837 A1 | 2/2002 | Levy |
| 2002/0175834 A1 | 11/2002 | Miller |
| 2003/0011495 A1 | 1/2003 | Trell |
| 2003/0067444 A1 | 4/2003 | Ehrenburg |
| 2003/0103791 A1 | 6/2003 | Chen |
| 2003/0137802 A1 | 7/2003 | Von Novak |
| 2003/0179178 A1 | 9/2003 | Zargham |
| 2004/0046733 A1 | 3/2004 | Forlenza et al. |
| 2005/0052291 A1 | 3/2005 | Backman et al. |
| 2006/0061490 A1 | 3/2006 | Benson |
| 2006/0071908 A1 | 4/2006 | Rehbock |
| 2006/0202865 A1 | 9/2006 | Nguyen |
| 2007/0269776 A1 | 11/2007 | Fux et al. |
| 2007/0286663 A1 | 12/2007 | Kinney |
| 2008/0174553 A1 | 7/2008 | Trust |
| 2009/0051659 A1 | 2/2009 | Mickelborough |
| 2009/0153487 A1 | 6/2009 | Gunther et al. |
| 2009/0324316 A1 | 12/2009 | Shvartser |
| 2010/0052950 A1 | 3/2010 | Collier |
| 2011/0035696 A1 | 2/2011 | Elazari et al. |
| 2011/0095987 A1 | 4/2011 | Yoshimoto |
| 2011/0215954 A1 | 9/2011 | Page |
| 2012/0293417 A1 | 11/2012 | Dennis |
| 2013/0113714 A1 | 5/2013 | Mao |
| 2014/0071056 A1 | 3/2014 | Liu et al. |
| 2014/0189610 A1 | 7/2014 | Jones et al. |
| 2014/0241780 A1 | 8/2014 | Knighton et al. |
| 2014/0267058 A1 | 9/2014 | Svensson |
| 2014/0292661 A1 | 10/2014 | Graumann et al. |
| 2014/0361992 A1 | 12/2014 | Chen |
| 2015/0103007 A1 | 4/2015 | Forshaug |
| 2015/0134642 A1 | 5/2015 | Chomley |
| 2015/0281422 A1 | 10/2015 | Kessler et al. |
| 2015/0293607 A1 | 10/2015 | Wu et al. |
| 2015/0370397 A1 | 12/2015 | Lawrence |
| 2016/0048668 A1 | 2/2016 | Zafiris |
| 2016/0054914 A1 | 2/2016 | Di Censo et al. |
| 2016/0170500 A1 | 6/2016 | Skogsrud et al. |
| 2016/0259407 A1 | 9/2016 | Schick |
| 2017/0083108 A1 | 3/2017 | Skogsrud et al. |
| 2017/0102867 A1 | 4/2017 | Bernard |
| 2017/0160818 A1 | 6/2017 | Knighton et al. |
| 2018/0329491 A1 | 11/2018 | Stouffer |

* cited by examiner

FLUID CHORD/CHARACTER ENTRY

CROSS-REFERENCE TO RELATED APPLICATIONS

This is a continuation of U.S. patent application Ser. No. 16/901,836 filed on Jun. 15, 2020, which claims priority to U.S. Prov. Patent App. No. 62/921,351 filed on Jun. 14, 2019, both of which are incorporated by reference.

BACKGROUND

Early hominins first developed speech almost two million years ago. Since that time, speech has evolved dramatically in both complexity and speed. Today, the average person speaks about 150 WPM and comprehends about 275 spoken WPM. Of course, speech is not necessarily permanent. People may speak to each other, but not memorialize their speech.

In contrast, writing is always permanent. Early civilizations developed writing almost 6,000 years ago. Since that time, writing has also evolved dramatically in both complexity and speed. Today, the average person writes about 13 WPM and comprehends about 250 written WPM. Thus, writing speed lags far behind speaking, speech comprehension, and written comprehension speeds.

Typewriters partially resolve that issue. The first typewriter was developed in the late 16th century. Since that time, typewriters, and subsequently keyboards, have improved dramatically. Today, the average person types about 40 WPM, while the average professional typist types about 75 WPM. Thus, even professional typing still lags far behind speaking, speech comprehension, and written comprehension speeds.

SUMMARY

In a first embodiment, a data entry system comprises: a processor configured to: receive a first data entry, make a first determination whether the first data entry is a first character entry or a first chorded entry, select a first output based on the first determination, and transmit the first output. In other embodiments, the processor may be further configured to: receive, after transmitting the first output, a second data entry; make a second determination whether the second data entry is a second character entry or a second chorded entry; select a second output based on the second determination; and transmit the second output. The first data entry may be the first character entry, and the second data entry may be the second chorded entry. The first data entry may be the first chorded entry, and the second data entry may be the second character entry. The first data entry may be the first character entry, and the second data entry may be the second character entry. The first data entry may be the first chorded entry, and the second data entry may be the second chorded entry. The data entry system may further comprise: a data entry device comprising the processor; and an external device comprising a display configured to display the first output. The processor may be further configured to further receive the first data entry by: detecting a movement of a key; making a second determination whether the movement is an up movement, a down movement, a left movement, a right movement, or a depression; and selecting the first data entry based on the second determination, wherein the first data entry is a text entry.

In a second embodiment, a computer program product comprises computer-executable instructions for storage on a non-transitory computer-readable medium and that, when executed by a processor, cause a data entry system to: receive a first data entry; make a first determination whether the first data entry is a first character entry or a first chorded entry; select a first output based on the first determination; and transmit the first output. In other embodiments, the instructions may further cause the data entry system to: receive, after transmitting the first output, a second data entry; make a second determination whether the second data entry is a second character entry or a second chorded entry; select a second output based on the second determination; and transmit the second output. The first data entry may be the first character entry, and the second data entry may be the second chorded entry. The first data entry may be the first chorded entry, and the second data entry may be the second character entry. The first data entry may be the first character entry, and the second data entry may be the second character entry. The first data entry may be the first chorded entry, and the second data entry may be the second chord entry. The instructions may further cause the data entry system to display the first output. The instructions may further cause the data entry system to further receive the first data entry by: detecting a movement of a key; making a second determination whether the movement is an up movement, a down movement, a left movement, a right movement, or a depression; and selecting the first data entry based on the second determination, wherein the first data entry is a text entry.

In a third embodiment, a data entry device comprises: a left-hand device comprising: a first key configured to provide dedicated data entry for a left-hand thumb, a second key configured to provide dedicated data entry for a first left-hand finger, a third key configured to provide dedicated data entry for a second left-hand finger, a fourth key configured to provide dedicated data entry for a third left-hand finger, and a fifth key configured to provide dedicated data entry for a fourth left-hand finger; and a right-hand device comprising: a sixth key configured to provide dedicated data entry for a right-hand thumb, a seventh key configured to provide dedicated data entry for a first right-hand finger, an eighth key configured to provide dedicated data entry for a second right-hand finger, a ninth key configured to provide dedicated data entry for a third right-hand finger, and a tenth key configured to provide dedicated data entry for a fourth right-hand finger, wherein the left-hand device and the right-hand device are configured to work together to receive data entries and transmit outputs based on the data entries. In other embodiments, the data entries may be any combination of character entries and chorded entries. The data entry device may further comprise a processor configured to: detect a movement of a key, wherein the key is one of the first key, the second key, the third key, the fourth key, the fifth key, the sixth key, the seventh key, the eighth key, the ninth key, and the tenth key; make a determination whether the movement is an up movement, a down movement, a left movement, a right movement, or a depression; and select a data entry based on the determination, wherein the data entry is a text entry. The up movement and the down movement may be in a first dimension, the left movement and the right movement may be in a second dimension, and the depression may be in a third dimension.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
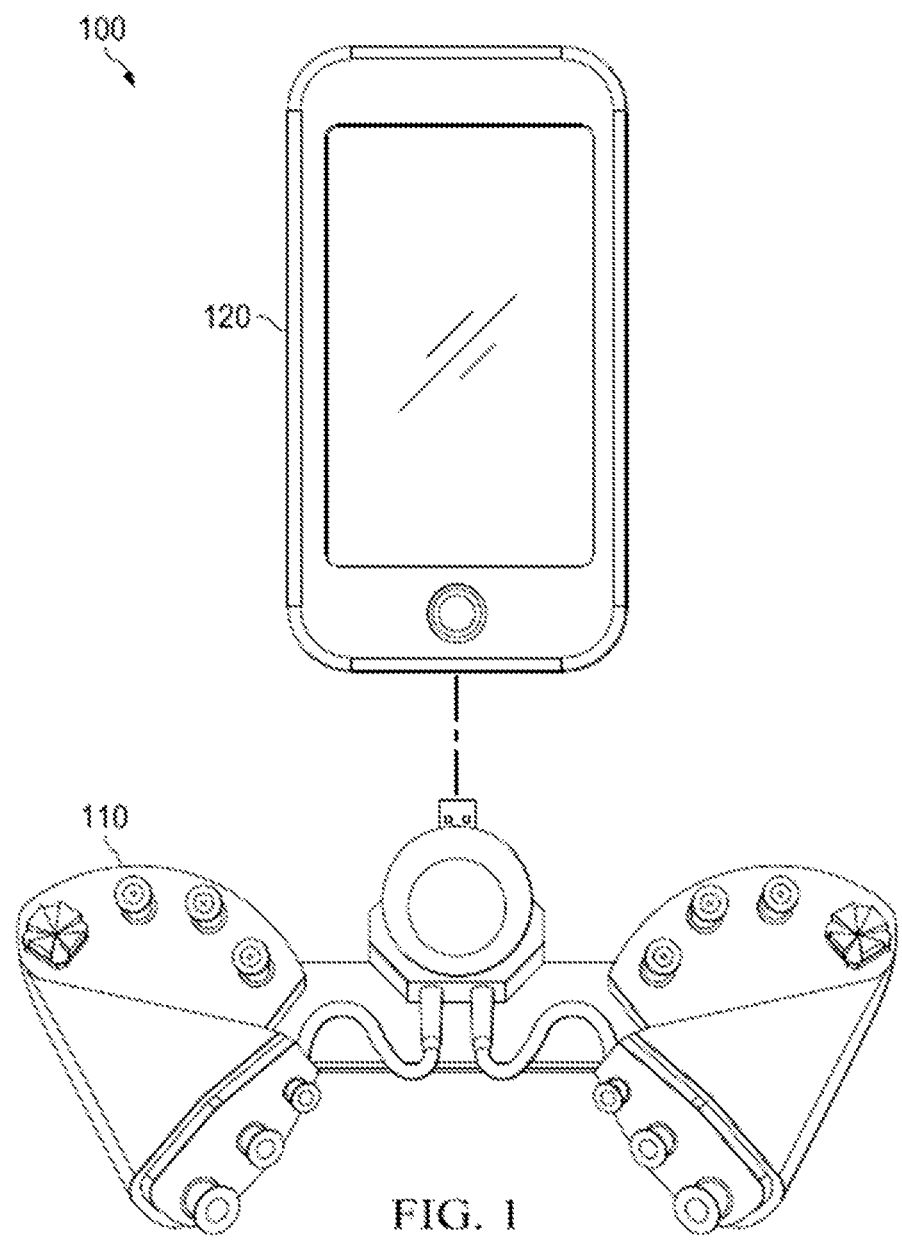
FIG. 1 is a schematic diagram of a data entry system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:

alt: alternate
ambi throw: ambidextrous throwover
ASCII: American Standard Code for Information Interchange
ASIC: application-specific integrated circuit
BS: backspace
CAD: computer-aided design
caps: caps lock
CPU: central processing unit
ctrl: control
del: delete
DSP: digital signal processor
EO: electrical-to-optical
esc: escape
FPGA: field-programmable gate array
ms: millisecond(s)
num-shift: number shift
OE: optical-to-electrical
prev: previous
RAM: random-access memory
RC: right click
RF: radio frequency
ROM: read-only memory
RX: receiver unit
SRAM: static RAM
TCAM: ternary content-addressable memory
TX: transmitter unit
USB: Universal Serial Bus
win: Windows
WPM: words per minute
1D: one-dimensional
2D: two-dimensional
3D: three-dimensional
°: degree(s).

Traditional typewriters and traditional keyboards perform character entry in which a user sequentially depresses keys to enter characters such as letters. Each key corresponds to only a single character. Thus, a user may type the word "cat" by sequentially depressing a "c" key, an "a" key, and a "t" key.

In contrast, chorded keyboards, including stenotypes, perform chorded entry in which a user simultaneously depresses keys to enter chords such as syllables, words, or phrases. No key corresponds to a single syllable, word, or phrase, much less a single character; rather, a combination of keys corresponds to a combination of characters forming a syllable, word, or phrase. Thus, a user may type the word "cat" by simultaneously depressing a first key corresponding to both "t" sounds and "k" sounds, a second key corresponding to "a," and a third key corresponding to both "t" sounds and "s" sounds.

Stenotypes provide quicker data entry compared to traditional typewriters. While a professional typist types about 75 WPM, a professional stenographer types about 180-225 WPM. However, 180-225 WPM still lags the average comprehension of about 275 spoken WPM and about 250 written WPM.

There is therefore a desire to overcome the following shortcomings of keyboards and stenotypes in order to improve beyond 180-225 WPM. First, keyboards perform character entry, but not chorded entry. In contrast, stenotypes perform chorded entry, but not character entry. Thus, both keyboards and stenotypes perform traditional data entry, which is unable to alternate between character entry and chorded entry. Second, keyboards and stenotypes have key layouts that are not ergonomic and are thus less efficient. Third, keyboards and stenotypes have 1D keys that allow a user to depress the keys in one direction to make a single data entry, but do not allow the user to move the keys in other directions to make different data entries.

Disclosed herein are embodiments for fluid chord/character entry. First, a data entry device performs fluid chord/character entry, which is able to distinguish and alternate between chorded entry and character entry. Second, the data entry device may comprise dedicated keys for each finger and thumb so that a user can enter data with comfort and the ability to maintain digital contact. Third, the data entry device comprises multi-dimensional keys, which can move in two or more directions to provide two or more different data entries. With those features, the data entry device allows a user to type over 300 WPM, in other words, to Type at the Speed of Thought®. In addition, the data entry device provides ambidextrous throwover and mouse functionality. Thus, the data entry device benefits stenographers, digital artists, CAD modelers, gamers, disabled people, and the general population in their everyday lives.

FIG. 1 is a schematic diagram of a data entry system 100. The data entry system 100 comprises a data entry device 110 and an external device 120. The data entry device 110 may be referred to as a ChaChorder®. The external device 120 may be a mobile phone, tablet computer, notebook computer, or desktop computer. The data entry device 110 and the external device 120 communicate data between each other. For instance, the data entry device 110 communicates data entries such as text entries to the external device 120 for display on the external device 120, or the data entry device 110 functions as a mouse to control a cursor displaying on the external device 120.

Figure 2:
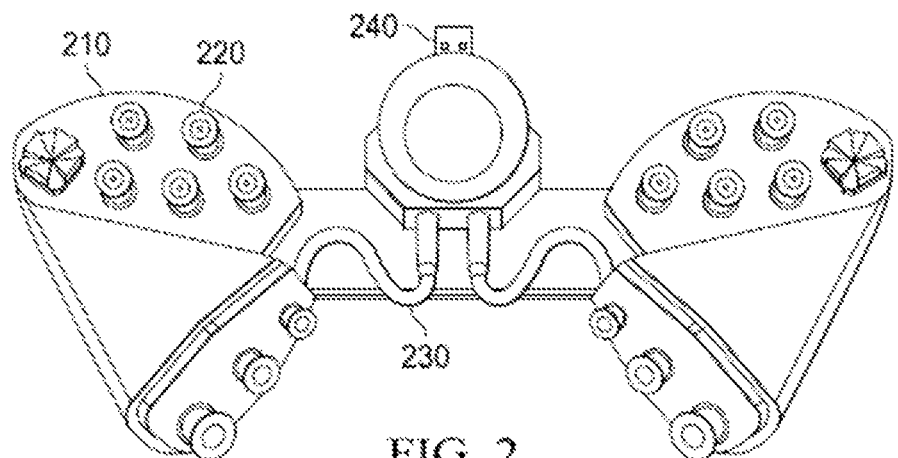
FIG. 2 is a schematic diagram of a data entry device according to an embodiment.

FIG. 2 is a schematic diagram of a data entry device 200 according to an embodiment. The data entry device 200 may implement the data entry device 110. The data entry device 200 comprises a casing 210, 18 keys 220, 2 cords 230, and a communications bus 240. The data entry device 200 has an ergonomic design that follows the contours of human hands, thus providing comfort for a user. The data entry device 200 is smaller than a typical keyboard or stenotype, thus providing better portability.

The casing 210 may comprise plastic, metal, wood, a polymer, a composite material, or another suitable material. The casing 210 is a single piece formed from a mold or is multiple such pieces bonded together to form the single piece. The casing 210 provides support for the keys 220, the cords 230, and the communications bus 240.

The keys 220 may also be referred to as switches. Though there are 18 keys 220 in the layout shown, the data entry device 200 may comprise 10 keys, 12 keys, 14 keys, or any other suitable number of keys in any suitable layout. Each of the keys 220 may be associated with both characters and chords. The keys 220 are described further below.

The cords 230 communicate data to and from the communications bus 240. The communications bus 240 may be a USB 1.0, USB 2.0, USB 3.x, or USB4 bus. The communications bus 240 communicates data to and from an external device such as the external device 120.

Figure 3:
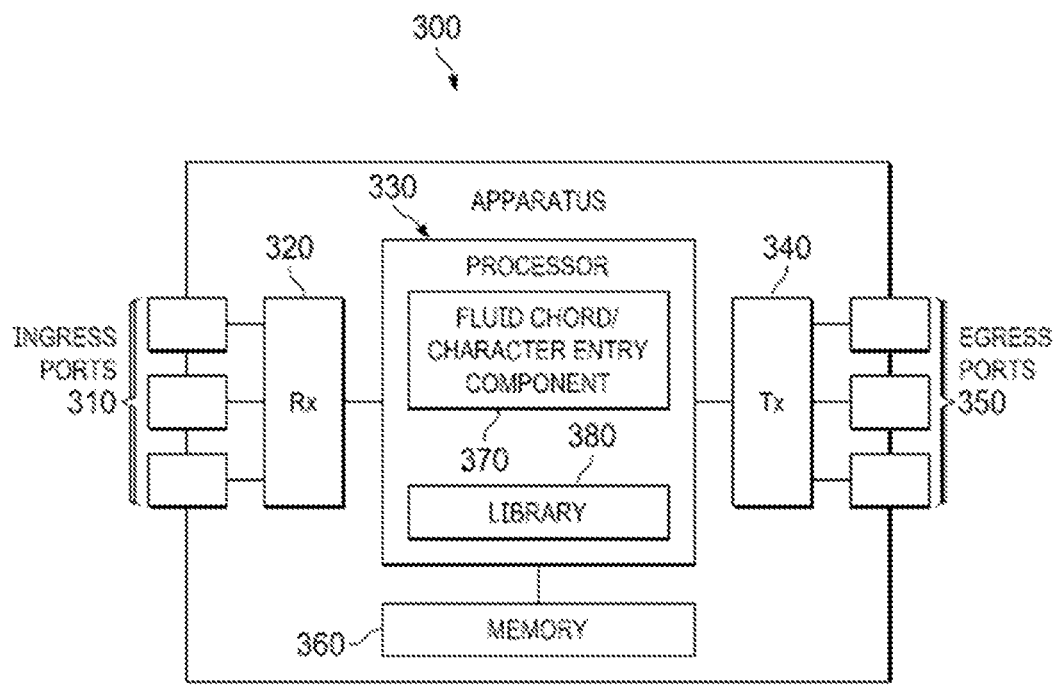
FIG. 3 is a schematic diagram of an apparatus.

FIG. 3 is a schematic diagram of an apparatus 300. The apparatus 300 may implement the disclosed embodiments, for instance the data entry devices 110, 200. The apparatus 300 comprises ingress ports 310 and an RX 320 to receive data; a processor 330 or logic unit, baseband unit, or CPU to process the data; a TX 340 and egress ports 350 to transmit the data; and a memory 360 to store the data. The apparatus 300 may also comprise communications buses such as the communications bus 240 or comprise OE components, EO components, or RF components coupled to the ingress ports 310, the RX 320, the TX 340, and the egress ports 350 to provide ingress or egress of optical signals, electrical signals, or RF signals.

The processor 330 is any combination of hardware, middleware, firmware, or software. The processor 330 comprises any combination of one or more CPU chips, cores, FPGAs, ASICs, or DSPs. The processor 330 communicates with the ingress ports 310, the RX 320, the TX 340, the egress ports 350, and the memory 360. The processor 330 comprises a fluid chord/character entry component 370, which implements the disclosed embodiments. The inclusion of the fluid chord/character entry component 370 therefore provides a substantial improvement to the functionality of the apparatus 300 and effects a transformation of the apparatus 300 to a different state. Alternatively, the memory 360 stores the fluid chord/character entry component 370 as instructions, and the processor 330 executes those instructions. The processor 330 further comprises a library 380. The library 380 maps data entries to characters and chords.

The processor 330 may comprise multiple processors or microcontrollers. For instance, the processor 330 comprises a first microcontroller that receives data entries from the keys 220 on the left side of the data entry device 200, a second microcontroller that receives data entries from the keys 220 on the right side of the data entry device 200, and a third microcontroller that combines the data entries from the first microcontroller and the second microcontroller and processes that data to create an output for the external device 120. The output may be in ASCII format.

The memory 360 comprises any combination of disks, tape drives, or solid-state drives. The apparatus 300 may use the memory 360 as an over-flow data storage device to store programs when the apparatus 300 selects those programs for execution and to store instructions and data that the apparatus 300 reads during execution of those programs, for instance as a computer program product. The memory 360 may be volatile or non-volatile and may be any combination of ROM, RAM, TCAM, or SRAM.

A computer program product may comprise computer-executable instructions stored on the memory 360 that, when executed by the processor 330, cause the apparatus 300 to perform any of the embodiments.

The components of the apparatus 300 may be in different devices. In a first example, the fluid chord/character entry component 370 is in a first device, and the library 380 is in a second device. In a second example, the processor 330 is in a first device, and the memory 360 is in a second device.

Fluid Chord/Character Entry

Figure 4:
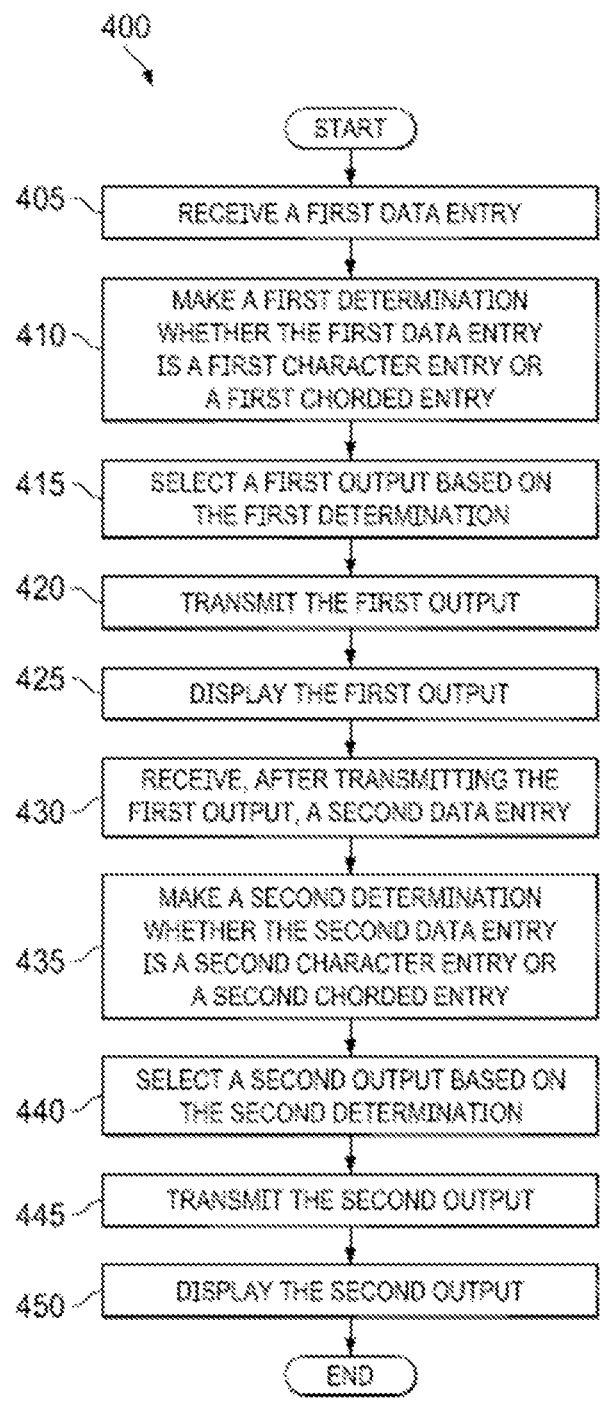
FIG. 4 is a flowchart illustrating a method of fluid chord/character entry according to an embodiment.

FIG. 4 is a flowchart illustrating a method 400 of fluid chord/character entry according to an embodiment. The data entry devices 110, 200 and the external device 120 perform the method 400.

At step 405, a first data entry is received. For instance, a user activates one or more of the keys 220 by pushing the keys 220 up, right, down, or left or by depressing the keys 220. The processor 330 receives a first data entry in response to that activation. The first data entry represents all activations of the keys 220 at a first time. The activations may be required to occur within a threshold amount of time.

At step 410, a first determination whether the first data entry is a first character entry or a first chorded entry is made. For instance, the fluid chord/character entry component 370 determines that the first data entry is a first character entry when it receives the first data entry from only one of the keys 220. Alternatively, the fluid chord/character entry component 370 determines that the first data entry is a first chorded entry when it receives the first data entry from at least two of the keys 220.

At step 415, a first output is selected based on the first determination. For instance, the fluid chord/character entry component 370 queries the library 380 to determine a first character corresponding to the first character entry. Alternatively, the fluid chord/character entry component 370 queries the library 380 to determine a first chord corresponding to the first chorded entry. The fluid chord/character entry component 370 then selects either the first character or the first chord as the first output. The fluid chord/character entry component 370 may perform step 415 independent of user selection.

At step 420, the first output is transmitted. For instance, the fluid chord/character entry component 370 transmits the first output to the external device 120.

At step 425, the first output is displayed. For instance, the external device 120 displays the first output on a screen of the external device 120.

At step 430, a second data entry is received after the first output is transmitted. The second data entry may also be received while or after the first output is displayed. For instance, a user activates one or more of the keys 220 by pushing the keys 220 up, right, down, or left or by depressing the keys 220. The processor 330 receives a second data entry in response to that activation. The second data entry represents all activations of the keys 220 at a second time. The activations may be required to occur within a threshold amount of time.

At step 435, a second determination whether the second data entry is a second character entry or a second chorded entry is made. For instance, the fluid chord/character entry component 370 determines that the second data entry is a second character entry when it receives the second data entry from only one of the keys 220. Alternatively, the fluid chord/character entry component 370 determines that the second data entry is a second chorded entry when it receives the second data entry from at least two of the keys 220.

At step 440, a second output is selected based on the second determination. For instance, the fluid chord/character entry component 370 queries the library 380 to determine a second character corresponding to the second character entry. Alternatively, the fluid chord/character entry component 370 queries the library 380 to determine a second chord corresponding to the second chorded entry. The fluid chord/character entry component 370 then selects either the second character or the second chord as the first output. The fluid chord/character entry component 370 may perform step 440 independent of user selection.

At step 445, the second output is transmitted. For instance, the fluid chord/character entry component 370 transmits the second output to the external device 120.

Finally, at step 450, the second output is displayed. For instance, the external device 120 displays the second output on the screen of the external device 120.

In the method 400, in a first example, the first data entry is the first character entry and the second data entry is the second chorded entry. In a second example, the first data entry is the first chorded entry and the second data entry is the second character entry. Thus, the data entry devices 110, 200 may perform fluid chord/character entry. The data entry devices 110, 200 may perform the method 400 continuously and thus continue to alternate between character entry and chorded entry.

In a third example, the first data entry is the first character entry and the second data entry is the second character entry. In a fourth example, the first data entry is the first chorded entry and the second data entry is the second chorded entry. Thus, the data entry devices 110, 200 may also perform traditional character entry or chorded entry, though the data entry devices 110, 200 do so by first making a determination to perform character entry or chorded entry.

In a fifth example, the first character entry and the second character entry are any letters of an alphabet, for instance the Latin alphabet, while the first chorded entry and the second chorded entry are any syllables, words, or phrases containing letters of the alphabet. In a sixth example, the first data entry or the second data entry is a command that may not be displayed. In a seventh example, the first data entry or the second data entry is a cursor movement that may be displayed.

Figure 5A:
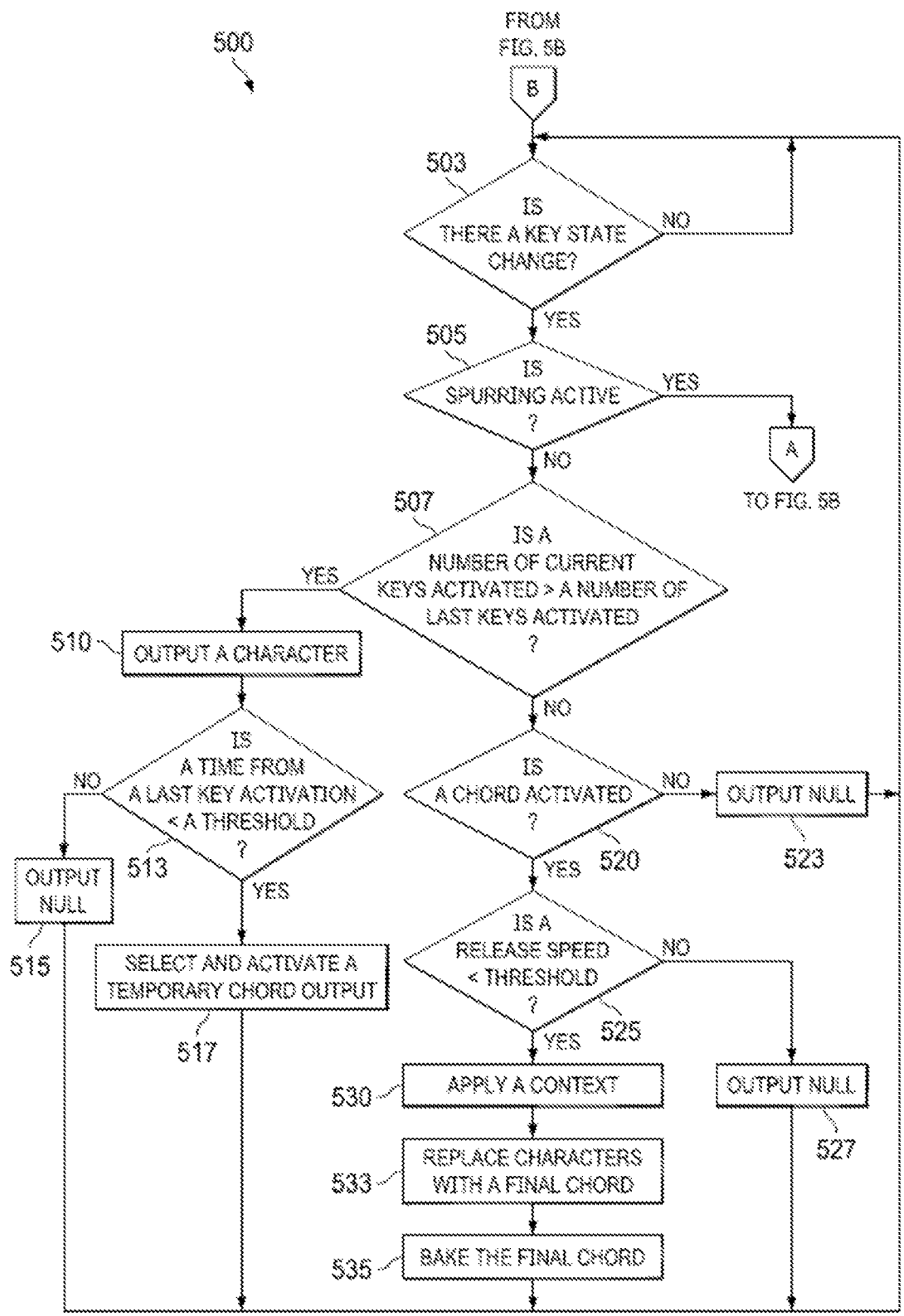
FIGS. 5A-5B are flowcharts illustrating a method of fluid chord/character entry according to another embodiment.
Figure 5B:
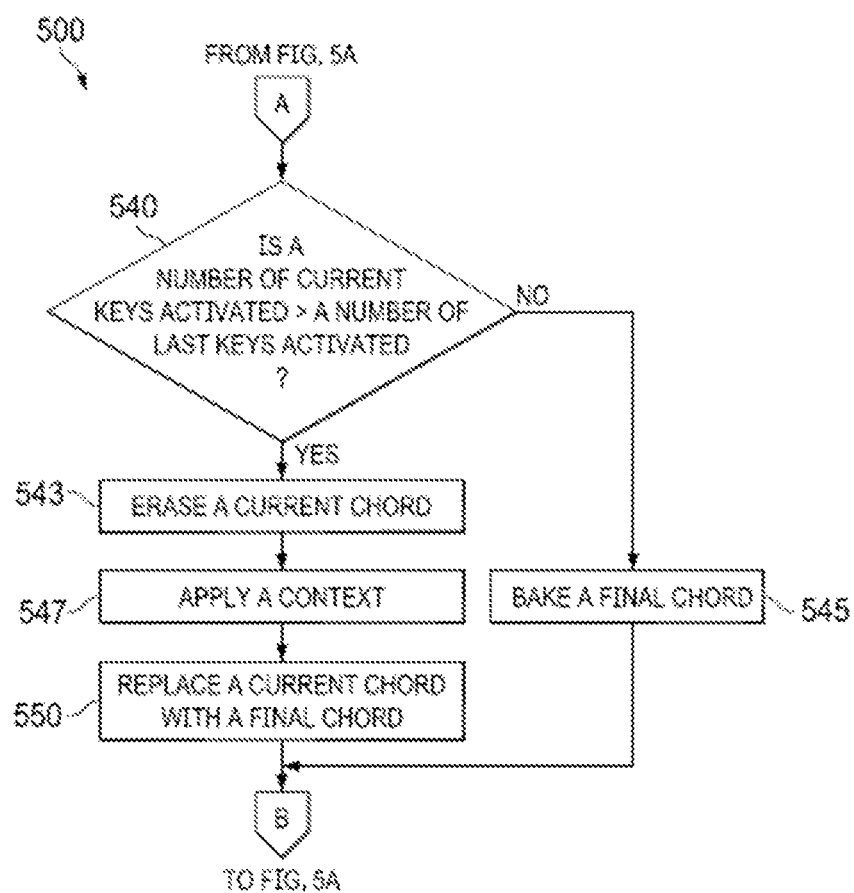

FIGS. 5A-5B are flowcharts illustrating a method 500 of fluid chord/character entry according to another embodiment. The data entry devices 110, 200 perform the method 500.

In FIG. 5A, at decision 503, it is determined whether there is a key state change. For instance, the fluid chord/character entry component 370 determines whether a key 220 has been activated or deactivated. A user deactivates a key 220 by releasing a push or a depression. If the answer to decision 503 is yes, then the method 500 proceeds to decision 505. If the answer to decision 503 is no, then the method 500 returns to decision 503.

At decision 505, it is determined whether spurring is active. For instance, the fluid chord/character entry component 370 determines whether spurring is active. The user may select whether to make spurring active. Spurring modifies recognition of chords during fluid chord/character entry. Specifically, to output a chord without spurring active, the user activates two or more keys 220 within a first threshold time and then deactivates those same keys 220 within a second threshold time. Fluid chord/character entry without spurring may result in false chords if the user types too fast. In contrast, to output a chord with spurring active, the user activates two or more keys 220 within a third threshold time and then may deactivate only one of those keys 220. The first threshold time, the second threshold time, and the third threshold time may be the same or different. If the answer to decision 505 is no, then the method 500 proceeds to decision 507. If the answer to decision 505 is yes, then the method 500 proceeds to decision 540 in FIG. 5B.

At decision 507, it is determined whether a number of current keys activated is greater than a number of last keys activated. For instance, if a user activates a first key 220 and maintains that activation while activating a second key 220, then the answer to decision 507 is yes. If a user activates the first key 220, then deactivates the first key 220, and then activates the second key 220, then the answer to decision 507 is no. If the answer to decision 507 is yes, then the method 500 proceeds to step 510. If the answer to decision 507 is no, then the method 500 proceeds to decision 520.

At step 510, a character is outputted. For instance, the fluid chord/character entry component 370 transmits the character to the external device 120, and the external device 120 displays the character on the screen of the external device 120.

At decision 513, it is determined whether a time from a last key activation is less than a threshold. For instance, the fluid chord/character entry component 370 determines whether a time from a last key 220 activation to the state change at decision 503 is less than a threshold. The threshold may be about 18 ms.

If the answer to decision 513 is no, then the method 500 proceeds to step 515. If the answer to decision 513 is yes, then the method proceeds to step 517.

At step 515, null is outputted and the method 500 returns to decision 503.

At step 517, a temporary chord output is selected and activated, and the method 500 returns to decision 503. For instance, the fluid chord/character entry component 370 transmits the chord to the external device 120, and the external device 120 displays the chord on the screen of the external device 120.

At decision 520, it is determined whether a chord is activated. For instance, the fluid chord/character entry component 370 determines whether two or more keys 220 are activated. If the answer to decision 520 is no, then the method 500 proceeds to step 523. If the answer to decision 520 is yes, then the method 500 proceeds to decision 525.

At step 523, null is outputted and the method 500 returns to decision 503.

At decision 525, it is determined whether a release speed is less than a threshold. For instance, the fluid chord/character entry component 370 determines whether a release speed of the current key 220 being activated is less than a threshold. The threshold may be about 18 ms. If the answer to decision 525 is no, then the method 500 proceeds to step 527. If the answer to decision 525 is yes, then the method 500 proceeds to step 530.

At step 527, null is outputted and the method 500 returns to decision 503.

At step 530, a context is applied. For instance, the fluid chord/character entry component 370 may select one chord in one context or a different chord in a different context. The context may include surrounding text. As a simple example, while the word "knowledge" can be chorded in a single data entry, or stroke, it can also be chorded in two strokes by following the chord "know'" with the chord "ledge." Rather than selecting "know ledge," the fluid chord/character entry component 370 automatically selects "knowledge" because the fluid chord/character entry component 370 knows that the chords "know" and "ledge" should form "knowledge." Suffixes, prefixes, and other chord modifiers are also applied at this stage.

At step 533, characters are replaced with a final chord. For instance, if the fluid chord/character entry component 370 previously outputted characters and then selects a final chord, then the fluid chord/character entry component 370 replaces those characters with the final chord.

At step 535, the final chord is baked and the method 500 returns to decision 503. Baking is the process of freezing and recording a result of a computing process.

In FIG. 5B, at decision 540, it is determined whether a number of current keys activated is greater than a number of last keys activated. For instance, a user may first activate a first key 220, maintain activation of the first key 220, and then activate a second key 220. If the answer to decision 540 is yes, then the method 500 proceeds to step 543. If the answer to decision 540 is no, then the method 500 proceeds to step 545.

At step 543, a current chord is erased. For instance, the fluid chord/character entry component 370 instructs the display of the external device 120 to remove a current chord.

At step 547, a context is applied. Step 547 is similar to step 530.

At step 550, a current chord is replaced with a final chord and the method 500 returns to decision 503. For instance, if the fluid chord/character entry component 370 previously outputted a temporary chord and then selects a final chord, then the fluid chord/character entry component 370 replaces that temporary chord with the final chord.

At step 545, a final chord is baked and the method 500 returns to decision 503. Before baking, the fluid chord/character entry component 370 stores a value so that the user can backspace entire words or sentences with future chords.

Dedicated Keys

Figure 6:
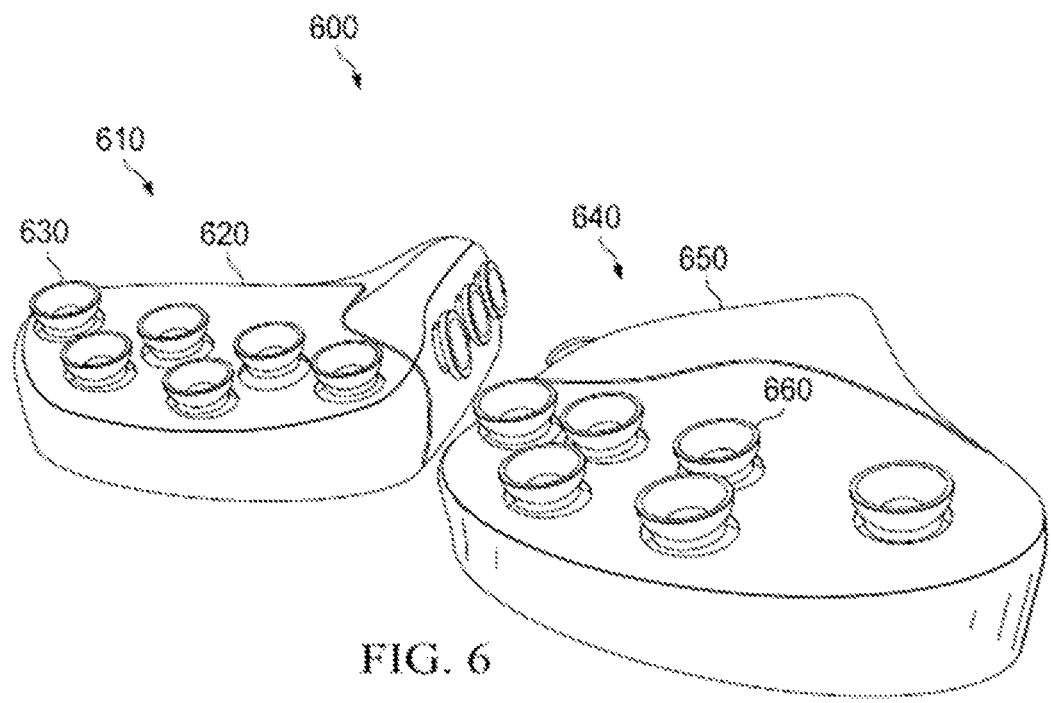
FIG. 6 is a schematic diagram of a data entry device according to another embodiment.

FIG. 6 is a schematic diagram of a data entry device 600 according to another embodiment of the disclosure. The data entry device 600 is similar to the data entry device 200. Specifically, the data entry device 600 comprises 2 casings 620, 650, which are similar to the casing 210, and 18 keys 630, 660, which are similar to the keys 220. In addition, the data entry device 600 communicates data to and from an external device.

However, unlike the casing 210, which is a single piece, the casings 620, 650 are two pieces. The casing 620 is part of a left-hand device 610, and the casing 650 is part of a right-hand device 640. Having both the left-hand device 610 and the right-hand device 640 provides improved comfort and portability. The casing 620 may contour to the shape of a left hand, and the casing 650 may contour to the shape of a right hand.

Each of the left-hand device 610 and the right-hand device 640 receives data entries and transmits outputs based on those data entries as described above. In addition, the left-hand device 610 and the right-hand device 640 work together to receive data entries and transmit outputs based on those data entries as described above. The data entries may be any combination of character entries and chorded entries. The character entries may be any character entries such as letters, including both vowels and consonants. The chorded entries may be any chorded entries such as syllables, words, phrases, macros, or sequences. In a first example, simultaneous activation of a first key 630 in the left-hand device 610 and a second key 660 in the right-hand device 640 results in a chorded entry. In a second example, simultaneous activation of a first key 630 and a second key 630 in the left-hand device 610 results in a chorded entry. In a third example, sequential activation of a first key 630 in the left-hand device 610 and a second key 660 in the right-hand device 640 results in a first character entry and a second character entry.

In addition, there is a dedicated key 630, 660 for each finger and thumb of the user. Specifically, a first key 630 provides dedicated data entry for a left-hand thumb, a second key 630 provides dedicated data entry for a first left-hand finger, a third key 630 provides dedicated data entry for a second left-hand finger, a fourth key 630 provides dedicated data entry for a third left-hand finger, a fifth key 630 provides dedicated data entry for a fourth left-hand finger, a sixth key 660 provides dedicated data entry for a right-hand thumb, a seventh key 660 provides dedicated data entry for a first right-hand finger, an eighth key 660 provides dedicated data entry for a second right-hand finger, a ninth key 660 provides dedicated data entry for a third right-hand finger, and a tenth key 660 provides dedicated data entry for a fourth right-hand finger. Thus, the user need not break contact with the keys 630, 660 in order to continue entering data. Thumbs have significant dexterity, particularly when compared to fingers, yet are used only for the spacebar in traditional keyboards. However, the keys 630, 660 dedicated to the thumbs are the same as the keys 630, 660 dedicated to the fingers. Thus, the thumbs are not limited to a single data entry like the spacebar, but may instead enter as much data as the fingers.

The remaining keys 630, 660 that are not dedicated to fingers or thumbs may output alternative data entries. Those data entries may be lesser-used data entries. In one example, the keys 630, 660 dedicated to the fingers and thumbs output data entries such as letters and other operations found on a traditional keyboard, while the remaining keys 630, 660 output other data entries or mouse control.

Furthermore, unlike the data entry device 200, the data entry device 600 may not comprise the cords 230 and the communications bus 240. Instead, the data entry device 600 wirelessly communicates with an external device using Bluetooth or another technique.

Multi-Dimensional Keys

Figure 7A:
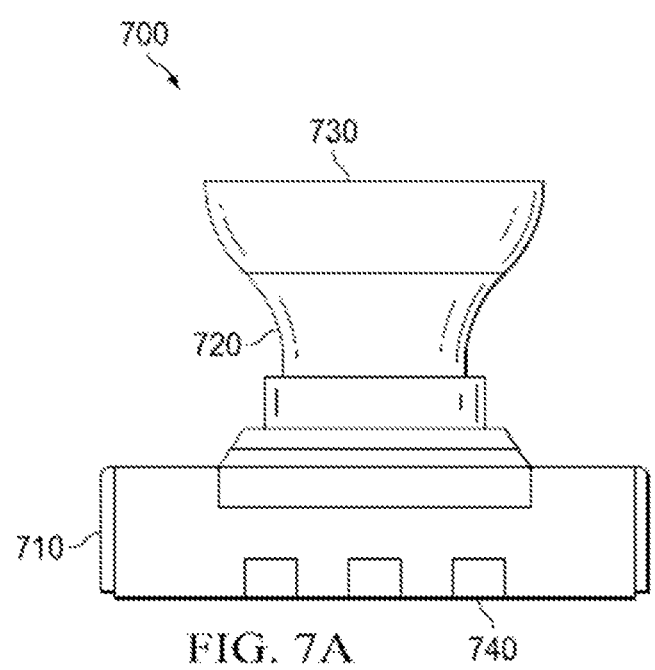
FIGS. 7A-7B are schematic diagrams of a key system according to an embodiment of the disclosure.
Figure 7B:
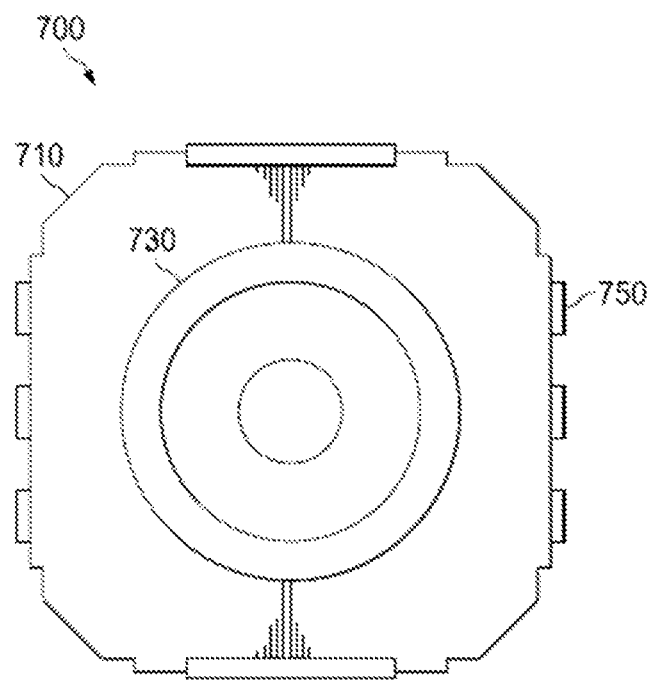

FIGS. 7A-7B are schematic diagrams of a key system 700 according to an embodiment of the disclosure. The data entry devices 110, 200, 600 comprise the key system 700 to implement the keys 220, 630, 660 for data entry, including text entry.

FIG. 7A is a side view of the key system 700. FIG. 7A shows that the key system 700 comprises a base 710, a stem 720, a key 730, and 3 bottom contacts 740 in the base 710. The base 710 secures the stem 720 and allows freedom of movement for the stem 720. The stem 720 secures the key 730. When a user depresses the key 730, the stem 720 physically touches the bottom contacts 740 to activate the bottom contacts 740 and output a data entry.

Together, the stem 720 and the key 730 move in multiple directions, including to the left of the page, to the back of the page, to the right of the page, to the front of the page, and to the bottom of the page. Movement to the left of the page corresponds to a left movement, movement to the back of the page corresponds to a top movement, movement to the right of the page corresponds to a right movement, movement to the front of the page corresponds to a down movement, and movement to the bottom of the page corresponds to a depression. Movement to the left of the page and the right of the page is in a first dimension, movement to the back of the page and the front of the page is in a second dimension, and movement to the bottom of the page is in a third dimension. Thus, the key 730 is 3D and provides 1D, 2D, and 3D data entry. Though five directions are described, the key 730 may move in more directions, for instance 8 directions, to provide additional alternative data entries.

FIG. 7B is a top view of the key system 700. Like FIG. 7A, FIG. 7B shows the base 710 and the key 730. However, unlike FIG. 7A, FIG. 7B does not show the bottom contacts 740. Instead, FIG. 7B shows 8 side contacts 750. When the user moves the key 730 to the left, the stem 720 physically touches the side contacts 750 on the left side of the page to activate those side contacts 750 and output a data entry. When the user moves the key 730 to the top, the stem 720 physically touches the side contacts 750 on the top of the page to activate those side contacts 750 and output a data entry. When the user moves the key 730 to the right, the stem 720 physically touches the side contacts 750 on the right side of the page to activate those side contacts 750 and output a data entry. When the user moves the key 730 to the bottom, the stem 720 physically touches the side contacts 750 on the bottom of the page to activate those side contacts 750 and output a data entry.

Custom Data Entry

The library 380 may comprise default key mappings. In addition, a user may modify the library 380 to comprise custom key mappings. Furthermore, the user may modify the library 380 to comprise custom macros, hotkeys, or hot words, which may function while only specific software is running. The number of possible data entries is essentially limitless.

Figure 8A:
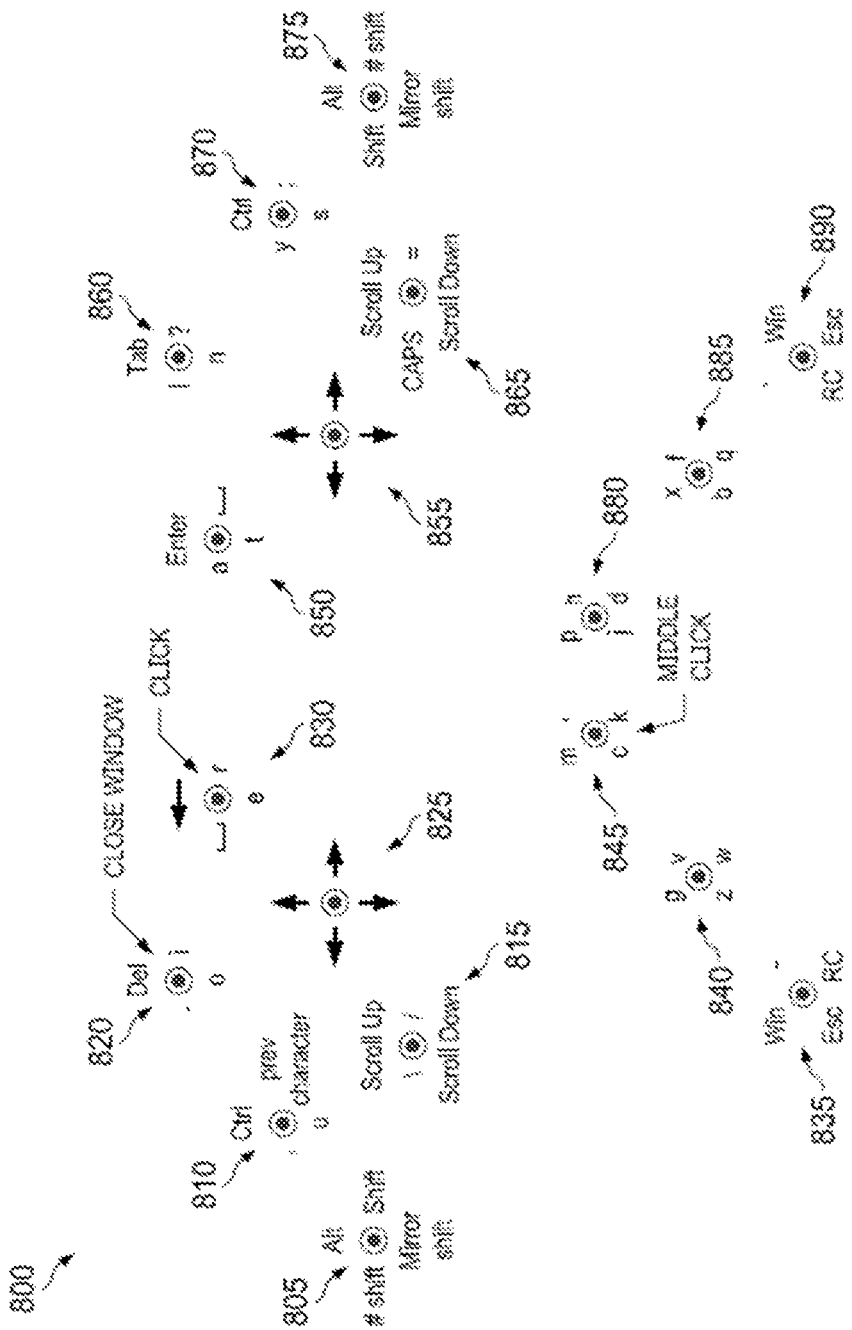
FIG. 8A is a diagram of a default key mapping according to an embodiment of the disclosure.

FIG. 8A is a diagram of a default key mapping 800 according to an embodiment of the disclosure. The default key mapping 800 shows data entries for 18 keys 805, 810, 815, 820, 825, 830, 835, 840, 845, 850, 855, 860, 865, 870, 875, 880, 885, 890. The layout of the keys 805-890 is similar to the layout of the keys 220, 630, 660. Each of the keys 805-890 corresponds to 4 or 5 data entries.

The keys 805-830 are oriented about 0° with respect to the top of the page, so the keys 805-830 output data entries located above the keys 805-890 in response to up movements; data entries below the keys 805-890 in response to down movements; data entries to the left of the keys 805-890 in response to left movements; data entries to the right of the keys 805-890 in response to right movements; and, if present, data entries on the keys 805-890 in response to depressions. The key 805 outputs an "alt" data entry in response to an up movement, a "mirror shift" data entry in response to a down movement, a "# shift" data entry in response to a left movement, and a "shift" data entry in response to a right movement. The "# shift" data entry shifts the keys 220, 630, 660 to a "# shift" key mapping in FIG. 8B. The key 810 outputs a "ctrl" data entry in response to an up movement, a "u" data entry in response to a down movement, a "," data entry in response to a left movement, and a "prev character" data entry in response to a right movement. The key 815 outputs a "scroll up" data entry in response to an up movement, a "scroll down" data entry in response to a down movement, a "\" data entry in response to a left movement, and a "/" data entry in response to a right movement. The key 820 outputs a "del" data entry in response to an up movement, an "o" data entry in response to a down movement, a "." data entry in response to a left movement, an "i" data entry in response to a right movement, and a "close window" data entry in response to a depression. The key 825 outputs a "↑" data entry in response to an up movement, a "↓" data entry in response to a down movement, a "←" data entry in response to a left movement, and a "→" data entry in response to a right movement. The key 830 outputs a "←" data entry in response to an up movement, an "e" data entry in response to a down movement, a "⎵" data entry in response to a left movement, an "r" data entry in response to a right movement, and a "click" data entry in response to a depression. The "←" data entry corresponds to a backspace operation. The "⎵" data entry corresponds to a spacebar operation.

The keys 835-845 are oriented about 45° counterclockwise with respect to the top of the page, so the keys 835-845 output data entries located at about 315° in response to up movements; data entries located at about 135° in response to down movements; data entries located at about 225° in response to left movements; data entries located at about 45° in response to right movements; and, if present, data entries on the keys 835-845 in response to depressions. The key 835 outputs a "win" data entry in response to an up movement, an "RC" data entry in response to a down movement, an "esc" data entry in response to a left movement, and a "-" data entry in response to a right movement. The "win" data entry opens a start menu in a computer operating a Windows operating system. The key 840 outputs a "g" data entry in response to an up movement, a "w" data entry in response to a down movement, a "z" data entry in response to a left movement, and a "v" data entry in response to a right movement. The key 845 outputs an "m" data entry in response to an up movement, a "k" data entry in response to a down movement, a "c" data entry in response to a left movement, a "'" data entry in response to a right movement, and a "middle click" data entry in response to a depression.

The keys 850-875 are oriented about 0° with respect to the top of the page, so the keys 850-875 output data entries located above the keys 850-875 in response to up movements; data entries below the keys 850-875 in response to down movements; data entries to the left of the keys 850-875 in response to left movements; data entries to the right of the keys 850-875 in response to right movements; and, if present, data entries on the keys 850-875 in response to depressions. The key 850 outputs an "enter" data entry in response to an up movement, a "t" data entry in response to a down movement, an "a" data entry in response to a left movement, and "⎵" a data entry in response to a right movement. The key 855 outputs a "↑" data entry in response to an up movement, a "↓" data entry in response to a down movement, a "←" data entry in response to a left movement, and a "→" data entry in response to a right movement. The key 860 outputs a "tab" data entry in response to an up movement, an "n" data entry in response to a down movement, an "l" data entry in response to a left movement, and a "?" data entry in response to a right movement. The key 865 outputs a "scroll up" data entry in response to an up movement, a "scroll down" data entry in response to a down movement, a "caps" data entry in response to a left movement, and an "=" data entry in response to a right movement. The key 870 outputs a "ctrl" data entry in response to an up movement, an "s" data entry in response to a down movement, a "y" data entry in response to a left movement, and a ";" data entry in response to a right movement. The key 875 outputs an "alt" data entry in response to an up movement, a "mirror shift" data entry in response to a down movement, a "shift" data entry in response to a left movement, and a "# shift" data entry in response to a right movement.

The keys 880-890 are oriented about 45° clockwise with respect to the top of the page, so the keys 880-890 output data entries located at about 45° in response to up movements; data entries located at about 225° in response to down movements; data entries located at about 315° in response to left movements; data entries located at about 135° in response to right movements; and, if present, data entries on the keys 880-890 in response to depressions. The key 880 outputs an "h" data entry in response to an up movement, a "j" data entry in response to a down movement, a "p" data entry in response to a left movement, and a "d" data entry in response to a right movement. The key 885 outputs an "f" data entry in response to an up movement, a "b" data entry in response to a down movement, an "x" data entry in response to a left movement, and a "q" data entry in response to a right movement. The key 890 outputs a "win" data entry in response to an up movement, an "RC" data entry in response to a down movement, a """ data entry in response to a left movement, and an "esc" data entry in response to a right movement.

Figure 8B:
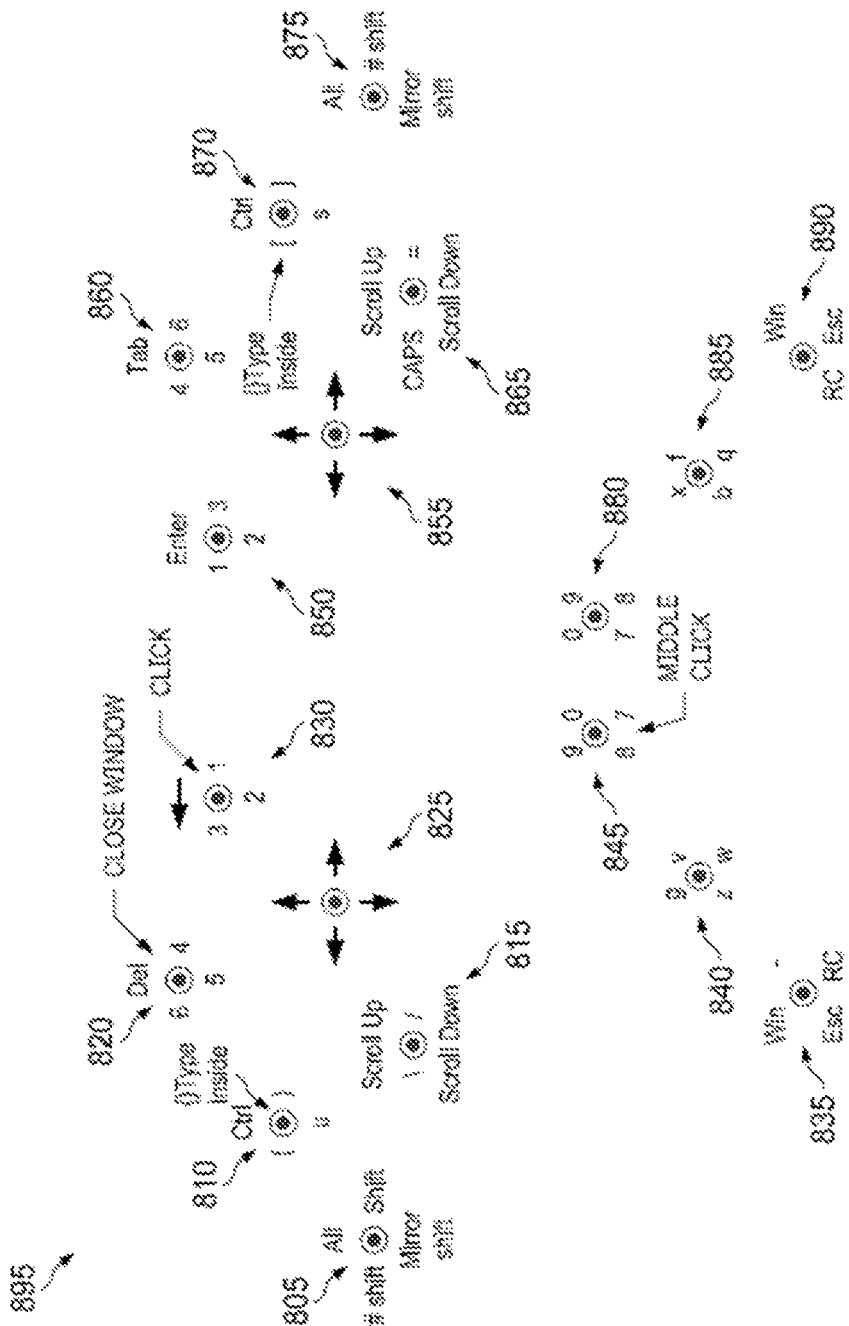
FIG. 8B is a diagram of a "# shift" key mapping according to an embodiment of the disclosure.

FIG. 8B is a diagram of a "# shift" key mapping 895 according to an embodiment of the disclosure. The "# shift" key mapping 895 shows data entries for the keys 805-890 after a "# shift" data entry from the keys 805, 875 while in the default key mapping 800. The orientations of the keys 805-890 are the same in the "# shift" key mapping 895 as they are in the default key mapping 800.

The key 805 outputs an "alt" data entry in response to an up movement, a "mirror shift" data entry in response to a down movement, a "# shift" data entry in response to a left movement, and a "shift" data entry in response to a right movement. The "# shift" data entry shifts the keys 220, 630, 660 to the default key mapping 800. The key 810 outputs a "ctrl" data entry in response to an up movement, a "u" data entry in response to a down movement, a "(" data entry in response to a left movement, a ")" data entry in response to a right movement, and a "( )" data entry in response to a depression. The "( )" data entry performs a "type inside" operation. The key 815 outputs a "scroll up" data entry in response to an up movement, a "scroll down" data entry in response to a down movement, a "\" data entry in response to a left movement, and a "/" data entry in response to a right movement. The key 820 outputs a "del" data entry in response to an up movement, a "5" data entry in response to a down movement, a "6" data entry in response to a left movement, and a "4" data entry in response to a right movement, and a "close window" data entry in response to a depression. The key 825 outputs a "↑" data entry in response to an up movement, a "↓" data entry in response to a down movement, a "←" data entry in response to a left movement, and a "→" data entry in response to a right movement. The key 830 outputs a "←" data entry in response to an up movement, a "2" data entry in response to a down movement, a "3" data entry in response to a left movement, a "1" data entry in response to a right movement, and a "click" data entry in response to a depression.

The key 835 outputs a "win" data entry in response to an up movement, an "RC" data entry in response to a down movement, an "esc" data entry in response to a left movement, and a "-" data entry in response to a right movement. The key 840 outputs a "G" data entry in response to an up movement, a "W" data entry in response to a down movement, a "Z" data entry in response to a left movement, and a "V" data entry in response to a right movement. The key 845 outputs a "9" data entry in response to an up movement, a "7" data entry in response to a down movement, an "8" data entry in response to a left movement, a "0" data entry in response to a right movement, and a "middle click" data entry in response to a depression.

The key 850 outputs an "enter" data entry in response to an up movement, a "2" data entry in response to a down movement, a "1" data entry in response to a left movement, and a "3" data entry in response to a right movement. The key 855 outputs a "↑" data entry in response to an up movement, a "↓" data entry in response to a down movement, a "←" data entry in response to a left movement, and a "→" data entry in response to a right movement. The key 860 outputs a "tab" data entry in response to an up movement, a "5" data entry in response to a down movement, a "4" data entry in response to a left movement, and a "6" data entry in response to a right movement. The key 865 outputs a "scroll up" data entry in response to an up movement, a "scroll down" data entry in response to a down movement, a "caps" data entry in response to a left movement, and an "=" data entry in response to a right movement. The key 870 outputs a "ctrl" data entry in response to an up movement, an "s" data entry in response to a down movement, a "[" data entry in response to a left movement, a "]" data entry in response to a right movement, and a "( )" data entry in response to a depression. The key 875 outputs an "alt" data entry in response to an up movement, a "mirror shift" data entry in response to a down movement, and a "# shift" data entry in response to a right movement.

The key 880 outputs a "9" data entry in response to an up movement, a "7" data entry in response to a down movement, a "0" data entry in response to a left movement, and an "8" data entry in response to a right movement. The key 885 outputs an "f" data entry in response to an up movement, a "b" data entry in response to a down movement, an "x" data entry in response to a left movement, and a "q" data entry in response to a right movement. The key 890 outputs a "win" data entry in response to an up movement, an "RC" data entry in response to a down movement, a """ data entry in response to a left movement, and an "esc" data entry in response to a right movement.

Figure 9:
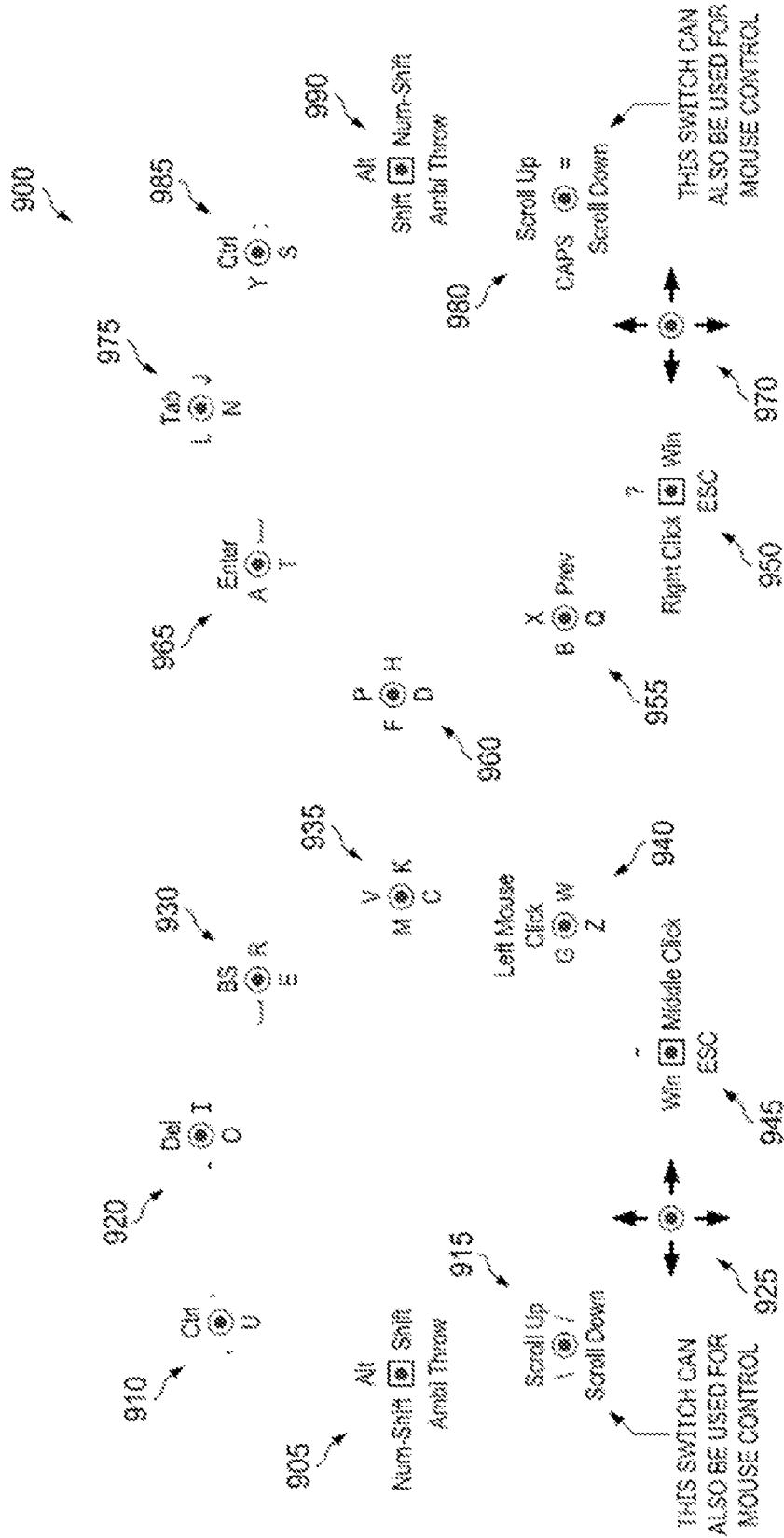
FIG. 9 is a diagram of a default key mapping according to another embodiment of the disclosure.

FIG. 9 is a diagram of a default key mapping 900 according to another embodiment of the disclosure. The default key mapping 900 shows data entries for 18 keys 905, 910, 915, 920, 925, 930, 935, 940, 945, 950, 955, 960, 965, 970, 975, 980, 985, 990. The layout of the keys 905-990 is similar to the layout of the keys 220, 630, 660. Each of the keys 905-990 corresponds to 4 or 5 data entries.

The key 905 outputs an "Alt" data entry in response to an up movement, an "Ambi Throw" data entry in response to a down movement, a "Num-Shift" data entry in response to a left movement, and a "Shift" data entry in response to a right movement. The "Ambi Throw" data entry enables ambidextrous throwover, which is discussed below. The key 910 outputs a "Ctrl" data entry in response to an up movement, a "U" data entry in response to a down movement, a "," data entry in response to a left movement, and a """ data entry in response to a right movement. The key 915 outputs a "Scroll Up" data entry in response to an up movement, a "Scroll Down" data entry in response to a down movement, a "\" data entry in response to a left movement, and a "/" data entry in response to a right movement. The key 920 outputs a "Del" data entry in response to an up movement, an "O" data entry in response to a down movement, a "." data entry in response to a left movement, and an "I" data entry in response to a right movement. The key 925 outputs a "↑" data entry in response to an up movement, a "↓" data entry in response to a down movement, a "←" data entry in response to a left movement, and a "→" data entry in response to a right movement. The key 930 outputs a "BS" data entry in response to an up movement, an "E" data entry in response to a down movement, a "␣" data entry in response to a left movement, and an "r" data entry in response to a right movement.

The key 935 outputs a "V" data entry in response to an up movement, a "C" data entry in response to a down movement, an "M" data entry in response to a left movement, and a "K" data entry in response to a right movement. The key 940 outputs a "left mouse click" data entry in response to an up movement, a "Z" data entry in response to a down movement, a "G" data entry in response to a left movement, and a "W" data entry in response to a right movement. The key 945 outputs a "-" data entry in response to an up movement, an "esc" data entry in response to a down movement, a "Win" data entry in response to a left movement, and a "Middle Click" data entry in response to a right movement.

The key 950 outputs a "?" data entry in response to an up movement, an "Esc" data entry in response to a down movement, a "Right Click" data entry in response to a left movement, and a "Win" data entry in response to a right movement. The key 955 outputs an "X" data entry in response to an up movement, a "Q" data entry in response to a down movement, a "B" data entry in response to a left movement, and a "prev" data entry in response to a right movement. The key 960 outputs a "P" data entry in response to an up movement, a "D" data entry in response to a down movement, an "F" data entry in response to a left movement, and an "H" data entry in response to a right movement.

The key 965 outputs an "Enter" data entry in response to an up movement, a "T" data entry in response to a down movement, an "A" data entry in response to a left movement, and a "␣" data entry in response to a right movement. The key 970 outputs a "↑" data entry in response to an up movement, a "↓" data entry in response to a down movement, a "←" data entry in response to a left movement, and a "→" data entry in response to a right movement. The key 975 outputs a "Tab" data entry in response to an up movement, an "N" data entry in response to a down movement, an "L" data entry in response to a left movement, and a "J" data entry in response to a right movement. The key 980 outputs a "scroll up" data entry in response to an up movement, a "scroll down" data entry in response to a down movement, a "CAPS" data entry in response to a left movement, and an "=" data entry in response to a right movement. The key 985 outputs a "Ctrl" data entry in response to an up movement, an "S" data entry in response to a down movement, a "Y" data entry in response to a left movement, and a ";" data entry in response to a right movement. The key 990 outputs an "Alt" data entry in response to an up movement, an "Ambi Throw" data entry in response to a down movement, a "Shift" data entry in response to a left movement, and a "Num-Shift" data entry in response to a right movement.

Figure 10:
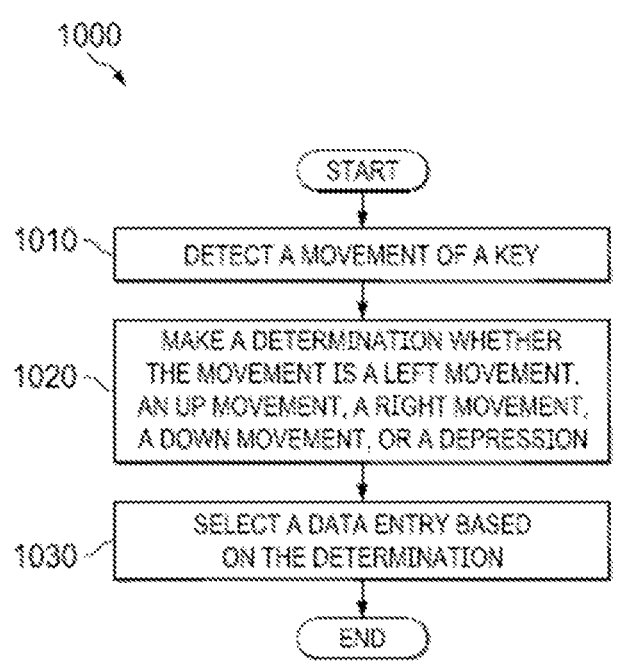
FIG. 10 is a flowchart illustrating a method of 3D data entry according to an embodiment of the disclosure.

FIG. 10 is a flowchart illustrating a method 1000 of 3D data entry according to an embodiment of the disclosure. The data entry devices 110, 200 perform the method 1000. The data entry devices 110, 200 may perform the method 1000 to implement steps 405 and 430 in FIG. 4.

At step 1010, a movement of a key is detected. For instance, the fluid chord/character entry component 370 detects that the stem 720 has physically touched at least one of the bottom contacts 740 or the side contacts 750.

At step 1020, a determination whether the movement is a left movement, an up movement, a right movement, a down movement, or a depression is made. For instance, the fluid chord/character entry component 370 determines whether the stem 720 has physically touched a side contact 750 on the left side of the page in FIG. 7B to correspond to a left movement, a side contact 750 on the top side of the page in FIG. 7B to correspond to an up movement, a side contact 750 on the right side of the page in FIG. 7B to correspond to a right movement, a side contact 750 on the bottom side of the page in FIG. 7B to correspond to a down movement, or a bottom contact 740 in FIG. 7A to correspond to a depression.

Finally, at step 1030, a data entry is selected based on the first determination. The data entry may be the first data entry in step 405 or the second data entry in step 430, and the data entry may be a text entry. As an example, the movement is an up movement of the key 880 in the default key mapping 800, so the fluid chord/character entry component 370 selects "h" as the data entry.

Ambidextrous Throwover

A user may activate a key 220, 630, 660 or a set of keys 220, 630, 660 in order to enable ambidextrous throwover. Ambidextrous throwover allows the user to enter all data from either the left side of the data entry device 200 or the right side of the data entry device 200 or to enter all data from either the left-hand device 610 or the right-hand device 640. Ambidextrous throwover therefore permits the user to multitask by entering data with one hand and performing another task, such as drinking coffee, with another hand. When the user desires to disable ambidextrous throwover and therefore use both hands for data entry, the user may activate the same key 220, 630, 660 or set of keys 220, 630, 660.

Mouse Functionality

Movement of the keys 220, 630, 660, for instance the keys 815, 865, 915, 980, may control a cursor on the external device 120. For instance, a left movement of the keys 220, 630, 660 moves the cursor to the left; an up movement of the keys 220, 630, 660 moves the cursor up; a right movement of the keys 220, 630, 660 moves the cursor to the right; and a down movement of the keys 220, 630, 660 moves the cursor down. Thus, in addition to functioning as a keyboard or a stenotype, the data entry devices 110, 200, 600 may also function as a mouse. Providing both functionalities in the single data entry device 110, 200, 600 improves portability so that a user can plug in and play the data entry device 110, 200, 600 anywhere.

The term "about" means a range including ±10% of the subsequent number unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A data entry system comprising:
   a memory configured to store instructions; and
   a processor coupled to the memory and configured to execute the instructions to cause the data entry system to:
   determine whether a number of current keys activated is greater than a number of last keys activated;
   determine whether a chord is activated when the number of current keys activated is not greater than the number of last keys activated;
   determine whether a release speed is less than a first threshold when the chord is activated;
   apply a context when the release speed is less than the first threshold;
   replace characters with a final chord after applying the context; and
   bake the final chord after replacing the characters with the final chord.

2. The data entry system of claim 1, wherein the processor is further configured to execute the instructions to cause the data entry system to determine whether the chord is activated by determining whether two or more keys are activated.

3. The data entry system of claim 1, wherein the release speed is of a current key.

4. The data entry system of claim 1, wherein the processor is further configured to execute the instructions to cause the data entry system to apply the context by applying appropriate suffixes, prefixes, and other chord modifiers.

5. The data entry system of claim 1, wherein the context comprises surrounding text.

6. The data entry system of claim 1, wherein the processor is further configured to execute the instructions to cause the data entry system to replace the characters with the final chord by replacing previously-outputted characters with the final chord.

7. The data entry system of claim 1, wherein the processor is further configured to execute the instructions to cause the data entry system to bake the final chord by freezing and recording a result of a computing process.

8. The data entry system of claim 1, wherein the processor is further configured to execute the instructions to cause the data entry system to determine whether there is a key state change.

9. The data entry system of claim 8, wherein the processor is further configured to execute the instructions to cause the data entry system to determine whether there is the key state change by determining whether a key has been activated or deactivated.

10. The data entry system of claim 8, wherein the processor is further configured to execute the instructions to cause the data entry system to determine whether spurring is active when there is the key state change.

11. The data entry system of claim 10, wherein the spurring is based on a user selection.

12. The data entry system of claim 10, wherein the processor is further configured to execute the instructions to cause the data entry system to further determine whether the number of current keys activated is greater than the number of last keys activated when the spurring is not active.

13. The data entry system of claim 1, wherein the processor is further configured to execute the instructions to cause the data entry system to output a character when the number of current keys activated is greater than the number of last keys activated.

14. The data entry system of claim 13, wherein the processor is further configured to execute the instructions to cause the data entry system to output the character by transmitting the character to an external device for displaying the character on a screen.

15. The data entry system of claim 13, wherein the processor is further configured to execute the instructions to cause the data entry system to determine whether a last time from a last key activation is less than a second threshold.

16. The data entry system of claim 15, wherein the second threshold is about 18 milliseconds (ms).

17. The data entry system of claim 15, wherein the processor is further configured to execute the instructions to cause the data entry system to select and activate a temporary chord output when the last time from the last key activation is less than the second threshold.

18. The data entry system of claim 17, wherein the processor is further configured to execute the instructions to cause the data entry system to select and activate the temporary chord output by transmitting the character to an external device for displaying the character on a screen.

19. A method implemented by a data entry system and comprising:
   determining whether a number of current keys activated is greater than a number of last keys activated;
   determining whether a chord is activated when the number of current keys activated is not greater than the number of last keys activated;
   determining whether a release speed is less than a first threshold when the chord is activated;
   applying a context when the release speed is less than the first threshold;
   replacing characters with a final chord after applying the context; and
   baking the final chord after replacing the characters with the final chord.

20. A computer program product comprising instructions that are stored on a computer-readable medium and that, when executed by a processor, cause a data entry system to:
   determine whether there is a key state change;
   determine whether spurring is active when there is the key state change;

determine whether a number of current keys activated is greater than a number of last keys activated when the spurring is active;
erase a current chord when the number of current keys activated is greater than the number of last keys activated;
apply a context after erasing the current chord; and
replace the current chord with a final chord after applying the context.

* * * * *